United States Patent [19]

Poole

[11] Patent Number: 4,974,931
[45] Date of Patent: Dec. 4, 1990

[54] WAVELENGTH SELECTIVE MODE COUPLERS

[75] Inventor: Craig D. Poole, Ocean Township, Monmouth County, N.J.

[73] Assignee: AT&T Bell Laboratories, Murray Hill, N.J.

[21] Appl. No.: 435,849

[22] Filed: Nov. 13, 1989

[51] Int. Cl.$^5$ .................................... G02B 6/14
[52] U.S. Cl. ............................ 350/96.29; 350/96.15
[58] Field of Search ............... 350/96.15, 96.16, 96.29, 350/96.30, 96.31, 96.33, 96.34

[56] References Cited

U.S. PATENT DOCUMENTS

| | | | |
|---|---|---|---|
| 3,891,302 | 6/1978 | Dabby et al. | 350/96.30 X |
| 3,912,478 | 10/1975 | Presby | 65/2 |
| 3,969,016 | 7/1976 | Kaiser et al. | 350/96.30 X |
| 4,038,062 | 7/1977 | Presby | 65/2 |
| 4,071,834 | 1/1978 | Comte | 333/95 R |
| 4,093,343 | 6/1978 | Hargrove | 350/96.30 |
| 4,176,911 | 12/1979 | Marcatili et al. | 350/96.31 |
| 4,179,187 | 12/1979 | Maurer | 350/96.30 |
| 4,236,786 | 12/1980 | Keck | 350/96.15 |
| 4,246,585 | 1/1981 | Noerpel | 343/786 |

OTHER PUBLICATIONS

"Two-Mode Fiber Modal Coupler", May 1984, vol. 9, No. 5, *Optics Letters*, R. C. Youngquist, et al., pp. 177-179.

"Fiber-Optic Modal Coupler Using Periodic Microbending", Mar. 1986, vol. 11, No. 3, *Optics Letters*, J. N. Blake et al, pp. 177-179.

"Mode Conversion Caused by Surface Imperfections of a Dielectric Slab Waveguide" by Dietrich Marcuse, The Bell System Technical Journal, Dec., 1969, pp. 3187-3215.

"Mode Conversion Caused by Diameter Changes of a Round Dielectric Waveguide" by Dietrich Marcuse and Richard M. Derosier, The Bell System Technical Journal, Dec. 1969, pp. 3217-3232.

*Primary Examiner*—John D. Lee

[57] ABSTRACT

A mode coupler is disclosed which utilizes a circularly symmetric perturbation in an electromagnetic waveguide. Due to the circular symmetry of the perturbation, exact cross-sectional alignment of the perturbations is not needed when several of the devices are cascaded. Further, the mode coupling response is wavelength dependent, and therefore, may be employed in electromagnetic filtering applications.

8 Claims, 4 Drawing Sheets

COUPLER 300

4,974,931

WAVELENGTH SELECTIVE MODE COUPLERS

BACKGROUND OF THE INVENTION

1. Field of the Invention

This invention relates to mode couplers, and more particularly, to wavelength selective mode couplers.

2. Description of the Prior Art

A mode coupler is a device which causes energy to be transferred between fundamental modes of a waveguide. Mode couplers are useful in applications such as optical filtering and optical switching, and can be constructed from optical waveguides by bending the waveguide in predetermined patterns. One such mode coupler is disclosed in the article "Fiber-optic modal coupler using periodic microbending", by J. N. Blake et al. in *Optics Letters*, Vol. 11, No. 3, March 1986, at pages 177–179. In the disclosed mode coupler, an optical fiber, which propagates the LP01 and LP11 modes, is compressed between corrugated surfaces such that a periodic "microbending" is induced in the fiber, resulting in coupling between the two modes. Since this mode coupler shows only a slight dependence on the wavelength of the propagating energy, its use in filtering applications is limited. Further, these mode couplers cannot be cascaded easily.

This cascading problem can best be explained with reference to FIGS. 1 and 2. FIG. 1 shows a schematic representation of the cross-section of modes LP01 and LP11 as they propagate in a typical waveguide. The arrows indicate the direction of the electric fields present in each mode and the corrugation is assumed to be in the Y direction. The prior art waveguides, such as the mode coupler in the above-mentioned article, can only transfer energy from the LP01(*a*) mode to the LP11(*a*) mode, but not to the LP11(*c*) mode. Similarly, the mode coupler can only transfer energy from the LP01(*b*) mode to the LP11(*b*) mode, but not to the LP11(*d*) mode. Thus, after mode coupling, the electric field of the LP11 mode is polarized identically to the electric field of the LP01 mode. With this in mind, note that FIG. 2 shows two prior art mode coupling devices 202 and 203, coupled together at junction 201. According to well-known linear systems theory, the response of the entire device of FIG. 2 should be the product of the responses of the two separate waveguides 202 and 203. However, because the microbending is sinusoidal in the Y direction only, as shown, waveguides 202 and 203 must be aligned exactly so that the microbending in both waveguides is in the same direction. If the direction of the microbending of one of the waveguides is rotated slightly from the direction of the microbending of the other one, the cascaded pair of devices will not operate correctly. This alignment problem, caused by the fact that the bending is in only the Y direction, is extremely difficult to accomplish with current technology, and represents a drawback to the use of microbending to induce mode coupling. It is an aspect of the invention to eliminate the need for this exact alignment. It is another aspect of the invention to provide a mode coupler which can be utilized easily in filtering applications.

SUMMARY OF THE INVENTION

The foregoing problem in the prior art has been solved in accordance with the present invention which relates to a frequency selective mode coupler formed by inducing a circularly symmetric perturbation in an electromagnetic waveguide. For purposes of this specification, a circularly symmetric perturbation is defined as a bending of the waveguide in substantially all directions between zero and 360 degrees around the longitudinal axis, prior to bending, of the waveguide. The circular symmetry eliminates the need to exactly align the direction of the microbending of cascaded devices. Further, the inventive mode coupler is highly dependent upon wavelength, thereby permitting use in filtering applications.

DETAILED DESCRIPTION

Figure 3:
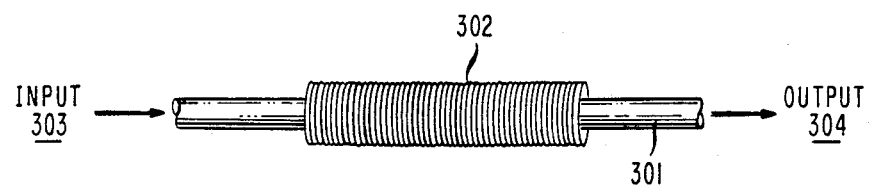
FIG. 3 shows a wavelength selective mode coupler in accordance with the present invention.

FIG. 3 shows a wavelength selective mode coupler 300 comprising a waveguide 301 wrapped by consecutive spirals of a single wire 302. The wire is tightly wrapped to induce a circularly symmetric perturbation in waveguide 301. It is assumed for purposes of explanation and not limitation that wire 302 is wrapped such that consecutive spirals are in contact with each other.

Figure 2:
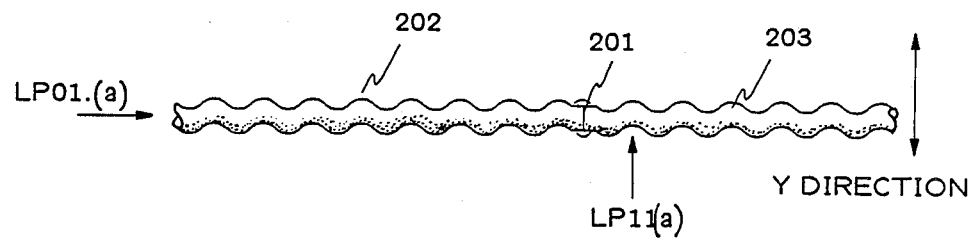
FIG. 2 shows a pair of prior art mode couplers utilizing microbending, that are cascaded together in series.

Each spiral of wire 302 around the waveguide 301 will cause the waveguide to microbend. The induced microbending will be a periodic, helical-type perturbation in the waveguide, with the period of the helix being equal to the diameter of wire 302. This microbending is circularly symmetric, eliminating the need to exactly align the direction of the microbending in cascaded devices, since the microbending is in all directions. More particularly, if each of the mode couplers 202 and 203 of FIG. 2 were replaced with a separate inventive mode coupler such as that of FIG. 3, either of the waveguides could be rotated about its longitudinal axis without affecting the performance. This property does not exist in the prior art waveguides of FIG. 2, since the microbending is in the Y direction only.

Figure 5:
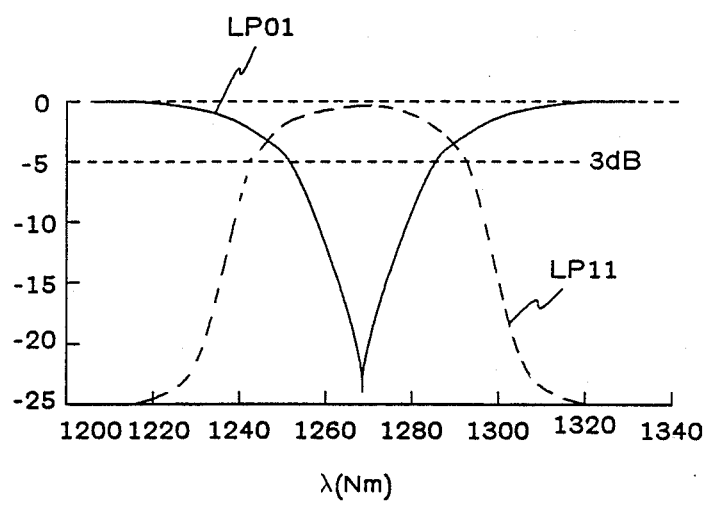
FIG. 5 shows a plot of a typical frequency response of the wavelength selective mode coupler of FIG. 5.

Returning to the operation of the mode coupler of FIG. 3, energy in the LP01 mode is injected at input 303 and propagates through waveguide 301. As the energy enters the wrapped portion of the waveguide, energy at a selected range of wavelength is coupled from the LP01 mode to the LP11 mode due to the perturbation, while energy at the remaining wavelengths remains in the LP01 mode. FIG. 5 shows a graphical representation of this phenomenon and is designed herein as the mode coupling response of the LP01 mode. Energy in the bandwidth from 1260–1280 nanometers is coupled to the higher order LP11 mode. The mode coupling resonance of the LP01 mode has a "notch" at approximately 1270 nm as shown in FIG. 5. Energy subtracted from the LP01 mode at various frequencies is shifted into the LP11 mode as shown. The wavelength at which the notch occurs can be selected based upon several design parameters to be described later herein. Further, a filter may be obtained by subsequently suppressing energy in one of the two modes.

Figure 4:
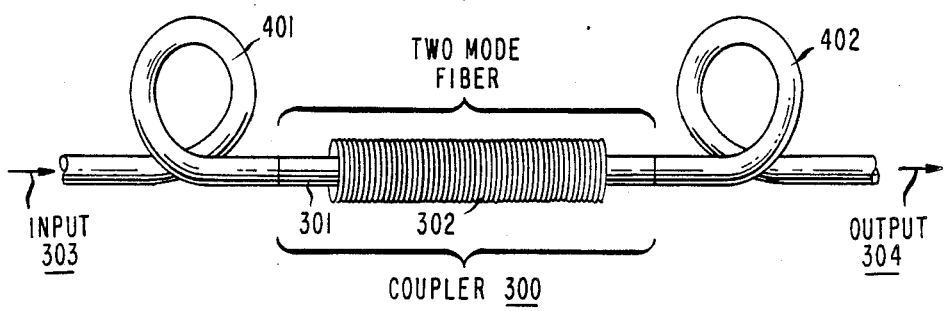
FIG. 4 shows an optical filter implemented using two mode strippers and a wavelength selective mode coupler.

FIG. 4 shows a series combination of (1) a first LP11 mode stripper 401, (2) a wavelength selective mode coupler 300, and (3) a second LP11 mode stripper 402. The design of mode strippers is well-known in the art, and can be used to practice this invention. Furthermore, a single mode waveguide can be used to suppress energy in one of the modes, rather than the mode stripper. In operation, energy enters at input 303, and propagates through mode stripper 401, which strips all energy in mode LP11. Mode stripper 401 guarantees that no energy is present in the LP11 mode when the signal enters the mode coupler 300. However, this is not required for operation of the invention, but merely guarantees a fixed input condition.

All energy entering the waveguide of the mode coupler 300 of the waveguide is thus confined to mode LP01. The wrapped portion of the waveguide acts as a mode coupler, as previously described, and shifts energy in a predetermined bandwidth from mode LP01 to mode LP11. Mode stripper 402 then strips the energy from mode LP11 leaving only the energy in LP01. Thus, at output 304, all energy in a preselected range of wavelengths is absent, and the remaining energy is confined to the LP01 mode. The device of FIG 4. is, therefore, an optical notch filter. Various desired filter responses can be obtained by cascading these notch filters in series and parallel in accordance with well-known theories of linear systems.

Figure 1:
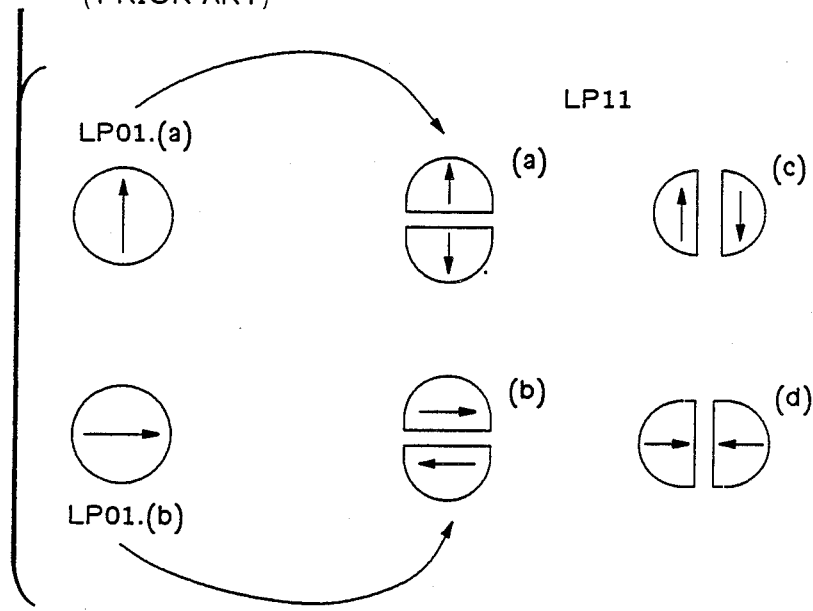
FIG. 1 shows a representation of propagating electric fields in two different modes in a typical prior art waveguide.

Since the microbending is circularly symmetric, the mode coupler produces electric fields which are circularly polarized clockwise and counterclockwise. Such fields can be equated to FIG. 1, where the vertical arrows represent clockwise polarized electric fields, and the horizontal arrows represent counterclockwise polarized electric fields. Further, energy in mode LP01($a$) is coupled to modes LP11($a$) and LP11($c$) while energy in mode LP01($b$) is coupled to modes LP11($b$) and LP11($d$).

The method of determining the location of the filter's notch can be described as follows: First, it should be noted that the response of the filter depends upon three parameters: (1) the number of spirals in the waveguide, as may be produced by the wire which is wrapped around the waveguide, (2) the depth of each spiral as may be produced by the tension in the wire, and (3) the period of the circularly symmetric perturbation, as may be determined by the diameter of the wire. More particularly, for circularly polarized light, the power in each mode at the output of the wrapped section is $$P_{01}(L) = |E_{01}(L)|^2 = \left(\cos^2\gamma L + \frac{\delta^2}{4\gamma^2}\sin^2\gamma L\right)P_{01}(0) + \quad (1)$$

$$\frac{C^2 p^2}{4\gamma^2}\sin^2\gamma L P_{11}(0) - \frac{Cp}{\gamma}\sin\gamma L\left(\frac{\delta}{2\gamma}\sin\gamma L\cos\Delta\phi - \cos\gamma L\sin\Delta\phi\right)\sqrt{P_{01}(0)P_{11}(0)}$$

$$P_{11}(L) = |E_{11}(L)|^2 = \frac{C^2 p^2}{4\gamma^2}\sin^2\gamma L P_{01}(0) + \quad (2)$$

-continued $$\left(\cos^2\gamma L + \frac{\delta^2}{4\gamma^2}\sin^2\gamma L\right)P_{11}(0) +$$

$$\frac{Cp}{\gamma}\sin\gamma L\left(\frac{\delta}{2\gamma}\sin\gamma L\cos\Delta\phi - \cos\gamma L\sin\Delta\phi\right)\sqrt{P_{01}(0)P_{11}(0)}$$

where $\delta = 2\pi/D - \Delta\beta(\lambda)$, D is the diameter of the wrapping wire, $\Delta\beta(\lambda)$ is the difference in propagation constants between the LP01 and LP11 modes, $$\gamma = \frac{1}{2}\sqrt{\delta^2 + (Cp)^2},$$

$P_{01}(0)$, $P_{11}(0)$, is the power in the LP01 mode and LP11 mode, respectively, when the signal enters the perturbation, $\Delta\phi$ is the difference in phase between the LP01 and LP11 mode when the signal enters the perturbation, L is the length of the perturbed section of the waveguide and C is a parameter experimentally determined to be 0.01 centimeters-grams.

The three selectable parameters in equations 1 and 2 are as mentioned above. Note that the number of turns N is implicit in the above equations since L=ND. Further, the notch of the filter occurs at maximum power transfer when $\Delta\beta(\lambda) = 2\pi/D$. Therefore, any of the three parameters above can be varied to produce various desired transfer functions, as prescribed by the above equations. Finally, it should be noted that the above equations serve only as a starting point for designing a filter with the desired response. Temperature, elasticity and shape of the wrapping wire, etc., will have an influence on the response of the filter. Therefore, once the design parameter are selected and the above equations utilized to design the mode coupler, an optical spectrum analyzer should be employed to actively fine tune the coupler to the desired bandwidth.

Figure 6:
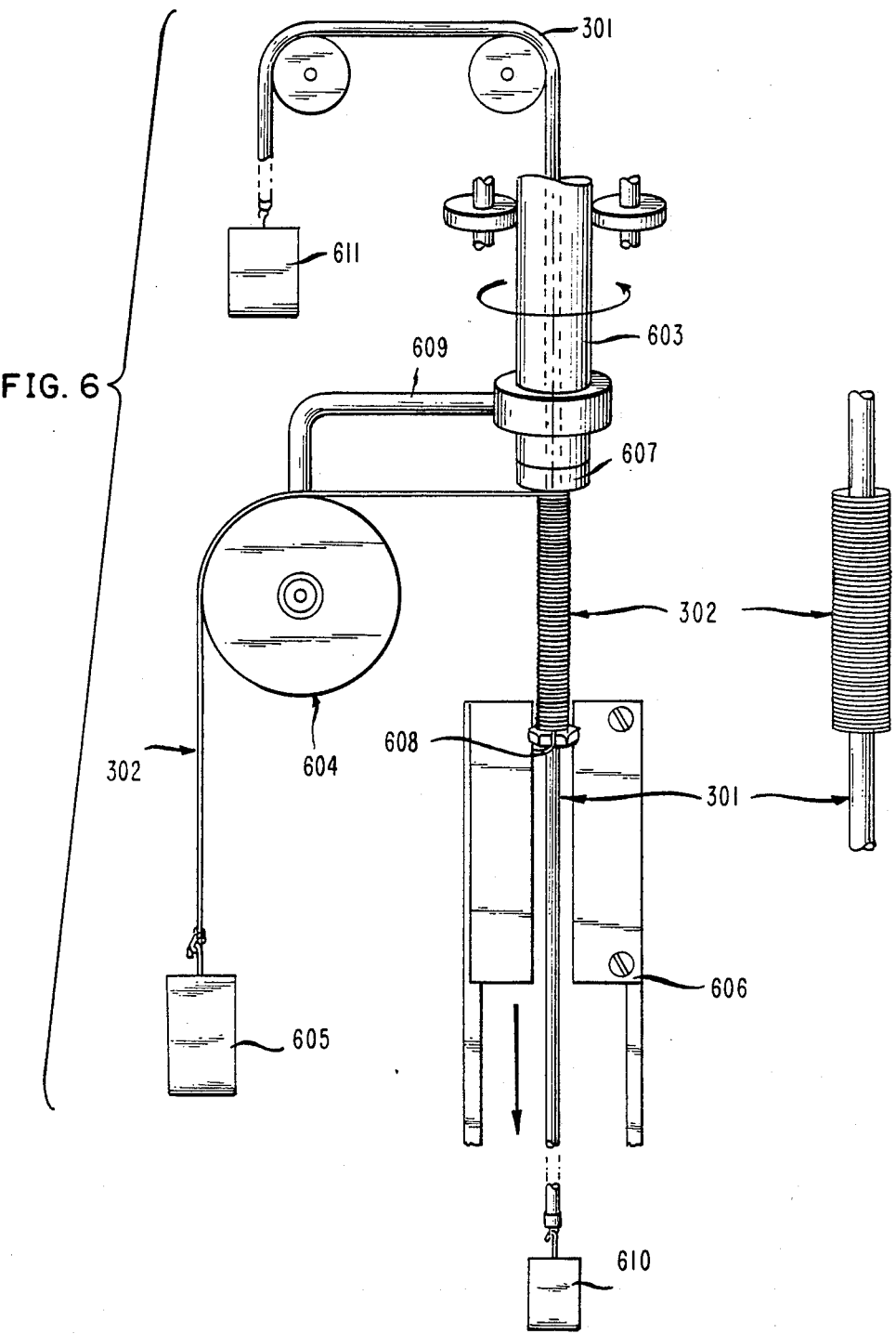
FIG. 6 shows an exemplary apparatus for manufacturing the inventive selective wavelength mode coupler.

FIG. 6 shows an exemplary apparatus for wrapping the fiber in accordance with the invention. The manufacturing apparatus of FIG. 6 comprises (1) a clamp guide 606, (2) a pulley 604, (3) a weight 605, equal to the desired tension in the wire to be wrapped around the waveguide, (4) a rotating shaft 603, (5) a cap 607, (6) a clamp 608, and other elements described hereafter. Waveguide 301 is threaded through a hole in cap 607, and then through rotating shaft 603, as shown. The hole in cap 605 is large enough to allow waveguide 301 to fit freely through it, but small enough that the wire wrapped portion of the waveguide cannot fit through it. A pair of weights 610 and 611 hold the waveguide taut. Clamp 608 is capable of sliding down clamp guide 606. In operation, rotating shaft 603 spins, powered by bearings 612, and thus arm 609 rotates in a circle perpendicular to the plane of the page in FIG. 6. This rotation causes the wire to be wrapped around the waveguide. Since the hole in cap 607 is not big enough to pass the wrapped portion of the waveguide, it pushes consecutive spirals of the wrapping wire against each other and thus forces the waveguide down. This in turn causes clamp 608 to slide down through clamp guide 606. It is to be understood that this apparatus is given only for purposes of illustration and that any means for wrapping the waveguide may be used.

It is to be understood that the example described hereinbefore is for illustrative purposes only and that other variations are possible without violating the scope and spirit of the invention. The spirals of wrapping wire could be placed some distance d apart. The response in this embodiment can be determined experimentally by first constructing the device of FIG. 3, and calculating the frequency response as described above. Then, other devices, each with a slightly greater separation between successive loops can be constructed, and the variation of frequency response measured. This would allow measurements to be taken as a function of the distance d between successive spirals, and thus, filters with various responses can be constructed. It should be noted that one of the reasons which prevents concise specification of the frequency response of this embodiment is that the frequency response will greatly vary based upon even a slight error in d and thus requires exact positioning of the wires wrapped around the waveguide. For this reason, the invention is easier to practice when built with adjacent spirals of wrapped wire tangent to each other.

It is to be understood that a perturbation in accordance with the present invention need not be helical. More particularly, any substantially circularly symmetric perturbation will suffice.

The performance of circularly symmetric perturbations other than helices must be determined experimentally by using an optical spectrum analyzer and varying the design parameters until the desired response is achieved.

I claim:

1. A wavelength selective mode coupler for optical energy, the optical energy being comprised of low frequencies below a first predetermined value, high frequencies above a second predetermined value, and midrange frequencies between the first and the second predetermined values, the mode coupler comprising:
   a waveguide capable of supporting at least a first mode and a second mode, the waveguide including:
   an input, for receiving optical energy in a first mode,
   a substantially circularly symmetric perturbation of a predetermined period, the period being such that energy at the low frequencies and at the high frequencies remains in the first mode, energy at a predetermined frequency of the midrange frequencies is substantially coupled entirely from the first mode to the second mode, and energy at the midrange frequencies and not at the predetermined frequency is coupled to the second mode by an amount which varies with frequency.

2. A wavelength selective mode coupler according to claim 1 wherein said substantially circularly symmetric perturbation is helical.

3. A wavelength selective mode coupler according to claim 1 or 2 wherein said substantially circularly symmetric perturbation is formed by wrapping a wire of predetermined diameter around said waveguide a predetermined number of times and at a predetermined tension to form a predetermined number of spirals.

4. A wavelength selective mode coupler according to claim 3, further comprising:
   a first mode stripper, arranged to receive an optical signal, to strip substantially all energy not in a predetermined mode, and to transmit energy within the predetermined mode to the waveguide, and
   a second mode stripper arranged to receive an optical signal from the output of the waveguide and to strip substantially all the energy not in a predetermined mode.

5. A wavelength selective mode coupler according to claim 1 or 2 further comprising:
   a first mode stripper, arranged to receive an optical signal, to strip substantially all energy not in a predetermined mode, and to transmit energy within the predetermined mode to the input of the waveguide, and
   a second mode stripper, arranged to receive an optical signal from the output of the waveguide and to strip substantially all the energy not in a predetermined mode.

6. A method of coupling optical energy in a first mode from the first mode to a second mode the method comprising the steps of:
   (a) injecting the optical energy in the first mode into a waveguide;
   (b) passing the optical energy through a substantially circularly symmetric perturbation in the waveguide, for coupling selected wavelengths of the optical energy from the first mode to a second mode and maintaining wavelengths not selected in the first mode, and
   (c) outputting the optical energy obtained in step (b) from the waveguide.

7. The method according to claim 6 wherein said substantially circularly symmetric perturbation is helical.

8. The method of claim 6 or 7 wherein
   step (a) includes the step of (a1) passing the optical energy through a first mode stripper for stripping substantially all energy not within the first mode, and
   step (c) of outputting includes the step of (c1) passing the optical energy through a second mode stripper for stripping substantially all energy not within the first mode.

* * * * *